(12) United States Patent
Vatterott et al.

(10) Patent No.: US 9,533,387 B2
(45) Date of Patent: Jan. 3, 2017

(54) APPARATUS AND CONTROL FOR MODULAR MANUFACTURING SYSTEM

(75) Inventors: Bryan Vatterott, Pacific, MO (US); Patrick Wilson, Union, MO (US)

(73) Assignee: Specialty Technologies L.L.C., Union, MO (US)

( * ) Notice: Subject to any disclaimer, the term of this patent is extended or adjusted under 35 U.S.C. 154(b) by 801 days.

(21) Appl. No.: 13/547,131

(22) Filed: Jul. 12, 2012

(65) Prior Publication Data

US 2014/0015389 A1  Jan. 16, 2014

(51) Int. Cl.
*B23Q 3/10* (2006.01)
*B23Q 1/01* (2006.01)
*B23Q 1/00* (2006.01)
*B23Q 37/00* (2006.01)

(52) U.S. Cl.
CPC ............. *B23Q 1/015* (2013.01); *B23Q 1/0009* (2013.01); *B23Q 1/0045* (2013.01); *B23Q 37/005* (2013.01)

(58) Field of Classification Search
CPC ........ B23Q 1/015; B23Q 1/0045; B23P 19/00; B23P 21/00; A47B 9/00
USPC  269/309, 289 R; 312/294; 248/51; 336/105; 29/700, 729; 108/147
See application file for complete search history.

(56) References Cited

U.S. PATENT DOCUMENTS

| | | |
|---|---|---|
| 3,760,336 A | 9/1973 | Cerwin |
| 4,151,976 A | 5/1979 | Schurman |
| 4,541,055 A | 9/1985 | Wolfe et al. |
| 4,697,318 A | 10/1987 | Wickham et al. |
| 4,790,695 A | 12/1988 | Abernethy |
| 4,819,476 A | 4/1989 | Bakermans et al. |
| 4,898,017 A | 2/1990 | Hite et al. |
| 5,013,017 A | 5/1991 | Swann |
| 5,074,032 A | 12/1991 | Anderson |
| 5,092,055 A | 3/1992 | Quinter |
| 5,106,325 A | 4/1992 | Robinson et al. |
| 5,107,577 A | 4/1992 | Jackson et al. |
| 5,117,122 A | 5/1992 | Hogarth et al. |
| 5,212,631 A | 5/1993 | Schmidt et al. |
| 5,270,098 A | 12/1993 | Priester et al. |
| 5,353,490 A | 10/1994 | Kukuljan |
| 5,399,806 A | 3/1995 | Olson |
| 5,415,022 A | 5/1995 | Bakermans et al. |
| 5,428,886 A | 7/1995 | Dupler et al. |
| 5,462,263 A | 10/1995 | Feltrin |
| 5,481,898 A | 1/1996 | Bakermans |
| 5,509,214 A | 4/1996 | Hudimac |
| 5,615,468 A | 4/1997 | Chubbuck |
| 5,616,965 A | 4/1997 | Wolf et al. |
| 5,733,024 A | 3/1998 | Slocum et al. |
| 5,735,056 A | 4/1998 | Gosine |
| 5,887,733 A | 3/1999 | Harvey et al. |
| 5,920,974 A * | 7/1999 | Bullen ................. B23P 21/004 29/33 K |

(Continued)

Primary Examiner — Lee D Wilson

(57) ABSTRACT

A modular manufacturing system uses a universal base and power infrastructure to receive a variety of tooling plates. This is accomplished by the creation of a modular service interface for simultaneous connection of electrical and fluid power from the base to the tooling plate. In addition, a sensing system is used to automatically identify the specific tool set, and to distinguish between a single plate tool set and a double plate tool set. Individual tool sets are located with certainty through the use of physical placement guide rollers, stops, and friction fit. A PLC manages the power, tool set identification and user interface.

9 Claims, 15 Drawing Sheets

(56) References Cited

U.S. PATENT DOCUMENTS

| | | | |
|---|---|---|---|
| 6,032,348 A | 3/2000 | Haas et al. | |
| 6,094,958 A | 8/2000 | Good | |
| 6,279,888 B1 | 8/2001 | Wal, III | |
| 6,439,561 B1 | 8/2002 | Ausilio | |
| 6,473,656 B1 | 10/2002 | Langels et al. | |
| 6,523,916 B2 | 2/2003 | Sucharczuk et al. | |
| 6,537,053 B1 | 3/2003 | Watkins | |
| 6,650,946 B2 | 11/2003 | Bauer | |
| 6,772,235 B2 | 8/2004 | Sawai et al. | |
| 6,913,487 B2 | 7/2005 | Beneke et al. | |
| 6,918,577 B2 | 7/2005 | Ghuman et al. | |
| 6,990,715 B2 * | 1/2006 | Liu | A61F 13/15772 156/349 |
| 7,024,261 B1 * | 4/2006 | Tanton | G05B 19/045 29/563 |
| 7,036,810 B2 | 5/2006 | Wal, III | |
| 7,096,073 B2 * | 8/2006 | Burkatovsky | G05B 19/0423 700/27 |
| 7,146,705 B2 | 12/2006 | Ahti et al. | |
| 7,190,093 B2 | 3/2007 | Bet et al. | |
| 7,302,989 B1 | 12/2007 | Kamel et al. | |
| 7,353,677 B2 | 4/2008 | Zusi | |
| 7,401,636 B2 | 7/2008 | O'Donnell et al. | |
| 7,457,106 B2 | 11/2008 | Ewing et al. | |
| 7,469,460 B2 * | 12/2008 | Jaeger | B23Q 1/01 29/564 |
| 7,591,653 B2 | 9/2009 | Boileau et al. | |
| 7,730,816 B2 | 6/2010 | Yamamoto | |
| 7,777,155 B2 | 8/2010 | Twelves, Jr. et al. | |
| 7,980,112 B2 * | 7/2011 | Boersma | B21D 22/06 72/446 |
| 8,053,669 B1 | 11/2011 | Sodini et al. | |
| 2002/0146294 A1 | 10/2002 | Martinez | |
| 2004/0055129 A1 | 3/2004 | Ghuman | |
| 2004/0055131 A1 | 3/2004 | Ghuman et al. | |
| 2004/0056069 A1 | 3/2004 | Ghuman | |
| 2004/0056497 A1 | 3/2004 | Ghuman et al. | |
| 2004/0124573 A1 | 7/2004 | Elman et al. | |
| 2004/0167647 A1 | 8/2004 | Ghuman et al. | |
| 2005/0044700 A1 | 3/2005 | Ghuman et al. | |
| 2005/0103823 A1 | 5/2005 | Domschot | |
| 2005/0109251 A1 * | 5/2005 | Bentschneider | B23P 21/00 108/147 |
| 2005/0152758 A1 | 7/2005 | Elman et al. | |
| 2005/0199305 A1 | 9/2005 | Webber et al. | |
| 2007/0006462 A1 * | 1/2007 | Van Zile, III | B23K 37/0443 29/897.2 |
| 2007/0270006 A1 | 11/2007 | Herges | |
| 2008/0105022 A1 | 5/2008 | Michonski | |
| 2008/0303197 A1 * | 12/2008 | Paquette | B23K 11/115 269/55 |
| 2009/0071681 A1 | 3/2009 | Junjie | |
| 2009/0124864 A1 | 5/2009 | Alexander et al. | |
| 2010/0209226 A1 * | 8/2010 | Flitsch | H01L 21/67017 414/749.1 |
| 2010/0229365 A1 | 9/2010 | Kipp et al. | |
| 2011/0047788 A1 * | 3/2011 | Immekus | B23P 21/00 29/729 |
| 2011/0120640 A1 | 5/2011 | Laker et al. | |
| 2014/0015389 A1 * | 1/2014 | Vatterott | B23Q 1/015 312/294 |

* cited by examiner

Tool set (prox. Switch) set-up
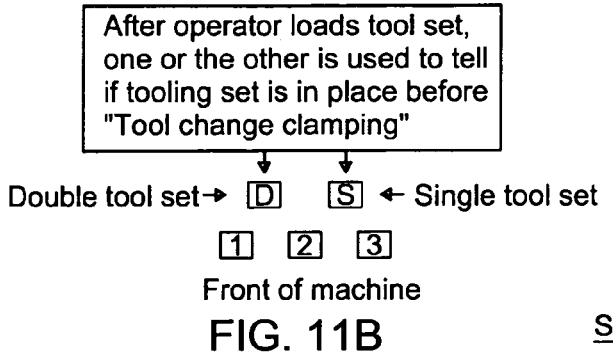
FIG. 11B
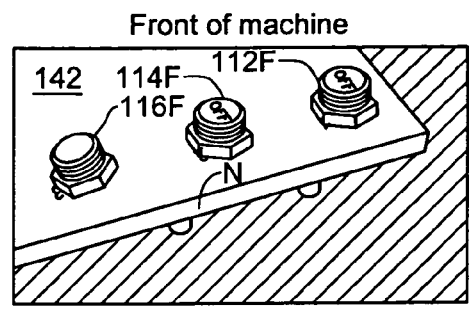
Sample of a Double tool set in location
This tool set will run program #4
FIG. 11A
During "Tool Change" on the tool change page, we need a big bar that changes if tool set is in proper location or not.
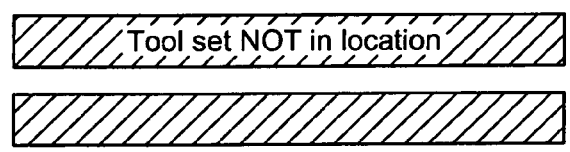
Tool set Ready
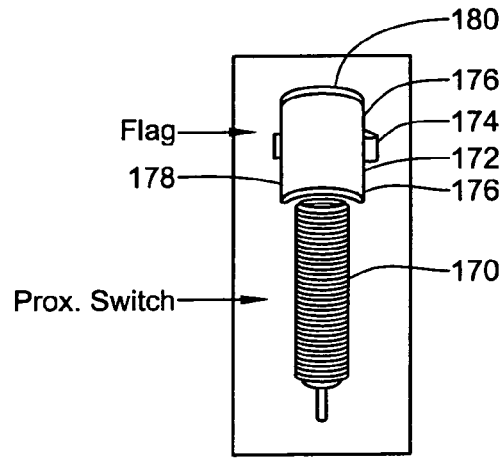
Sample Flag in Off position
FIG. 12
FIG. 11C SpecTech Standard Nylon tubing color code ⊘ Pressurized air line, when solenoid is OFF (Un-energized), And Vented when solenoid is ON (Energized)
⊘ Vented air line, when solenoid is OFF (Un-energized). And Pressurized, when solenoid is ON (Energized)
⊘ Non-Valved Pressurized air line
○ Vacuum line

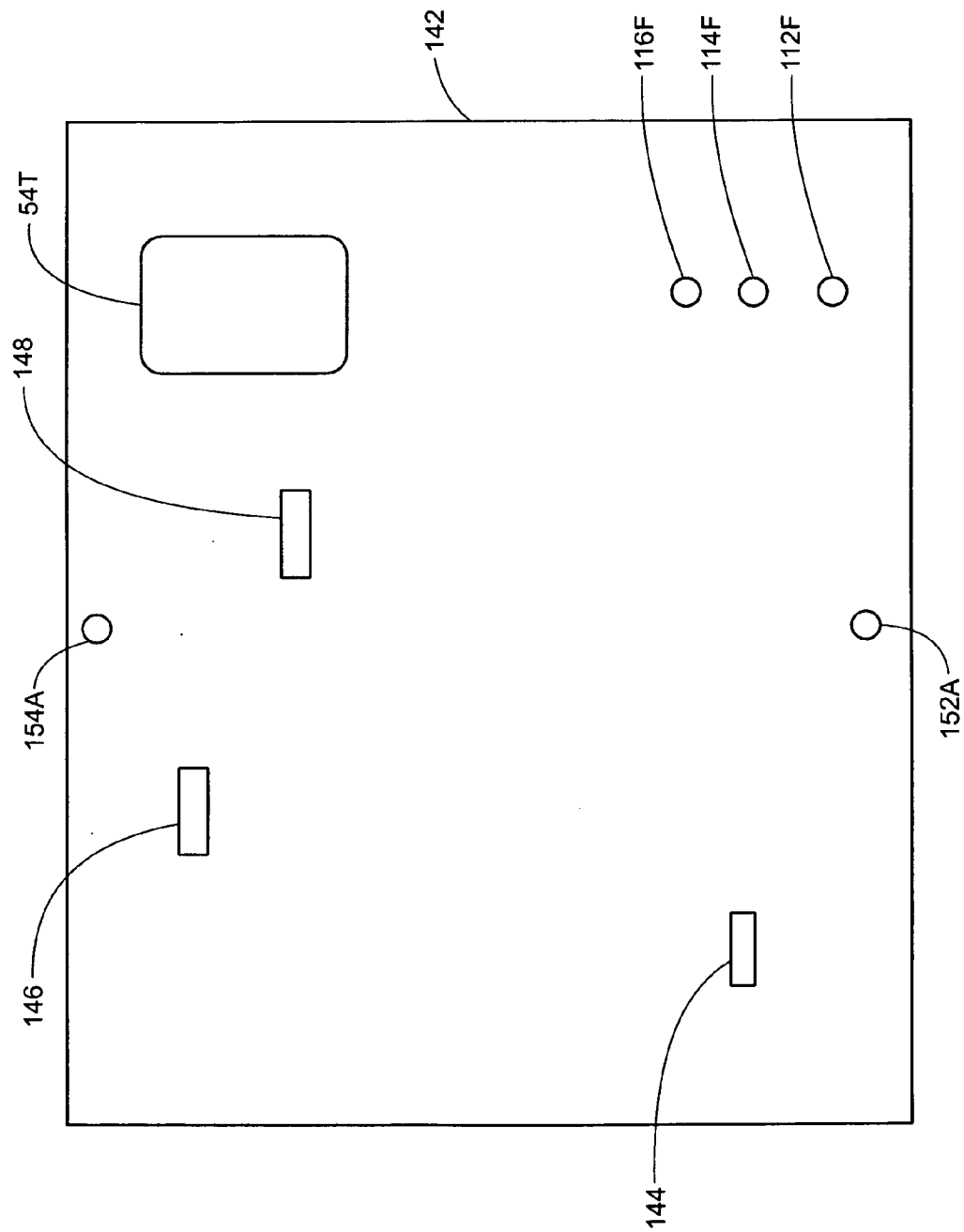

APPARATUS AND CONTROL FOR MODULAR MANUFACTURING SYSTEM

CROSS-REFERENCE TO RELATED APPLICATIONS

Not Applicable.

STATEMENT REGARDING FEDERALLY SPONSORED RESEARCH

Not Applicable.

APPENDIX

Not Applicable.

BACKGROUND OF THE INVENTION

Field of the Invention

The present invention relates to manufacturing systems and, more specifically, to modular manufacturing systems where modular tool sets may be swapped for different operations.

Related Art

In the area of tooling and tool sets, the typical approach is to have a machine that is designed to perform a specific operation using a specific tool set. Depending on volumes, it is not unusual for a particular machine to be in use for anywhere between 2 and 20 hours per week. There could easily be between 5 and 15 machines used to produce a specific product, with some machines having more use than others depending on volume. For example, a machine that produces wheels for a toy car may have four times the volume as a machine that produces the car body.

Each machine used shares common requirements. There is a need for power—often in the form of electricity and fluids (pneumatics and hydraulics). There is a need for a user interface to provide information on the process and to allow for interruptions of mechanical processes. There is a need to apply the power correctly to a work piece.

This application of power is accomplished through the use of a work piece-specific tool set, and through the managed application of electrical power and fluid power through the tool set. The management of the application of electrical power and fluid is often done through the use of a programmable logic controller (PLC). In addition, the PLC will usually manage the user interface.

Even though there are common requirements, each machine normally has unique requirements. Some machines need 2 electrical power sources and 2 pneumatic power sources connected to the tool set at specific locations, whereas other machines could need 4 electrical power sources, and no pneumatic power sources, and still others might require only pneumatic power sources only. These differing requirements make converting a particular machine from one operation with one tool set to another operation with a second tool set very tool-set dependent, time-consuming, and impractical. Moreover, the machine has to be converted back to its original condition for the first operation. Each change in tooling takes time and labor—meanwhile, the production worker may be simply waiting for the changeover.

Not surprisingly, prior efforts at attempting to use fewer machines to accomplish multiple machine operations have not been commercially or widely adopted. Accordingly, the machine tool industry largely uses separate purpose built machines for each operation, as this has been generally the most efficient approach.

SUMMARY OF THE INVENTION

The invention is a modular manufacturing system that uses a universal base and power infrastructure to receive a variety of manufacturing units (hereinafter "tooling plates"). This is accomplished by the creation of a modular service interface for simultaneous connection of electrical and fluid power from the base to the tooling plate. In addition, a sensing system is used to automatically identify the specific tool set, and to distinguish between a single plate tool set and a double plate tool set. Individual tool sets are located with certainty through the use of physical placement guide rollers, stops, and friction fit. A PLC manages the power, tool set identification and user interface.

The sensing system senses the presence or absence of permanent flags on a tooling plate. The flags may be arranged logically to recognize up to 8 different single tool sets and up to 8 different double tool sets. Upon recognition, the PLC initiates the appropriate user interface displays and activates the appropriate electrical, fluid, and data links.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 11A is a partial perspective view of the rear left corner of a tool plate of the modular manufacturing system of the present invention.

FIG. 11B defines an array of sensor positions.

FIG. 11C is a logic chart defining tool numbers according to flag positions.

FIG. 12 is an elevated side view of a proximity switch and a cutaway view of a flag of the present invention.

FIG. 17 is a bottom perspective view of a tool plate of the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
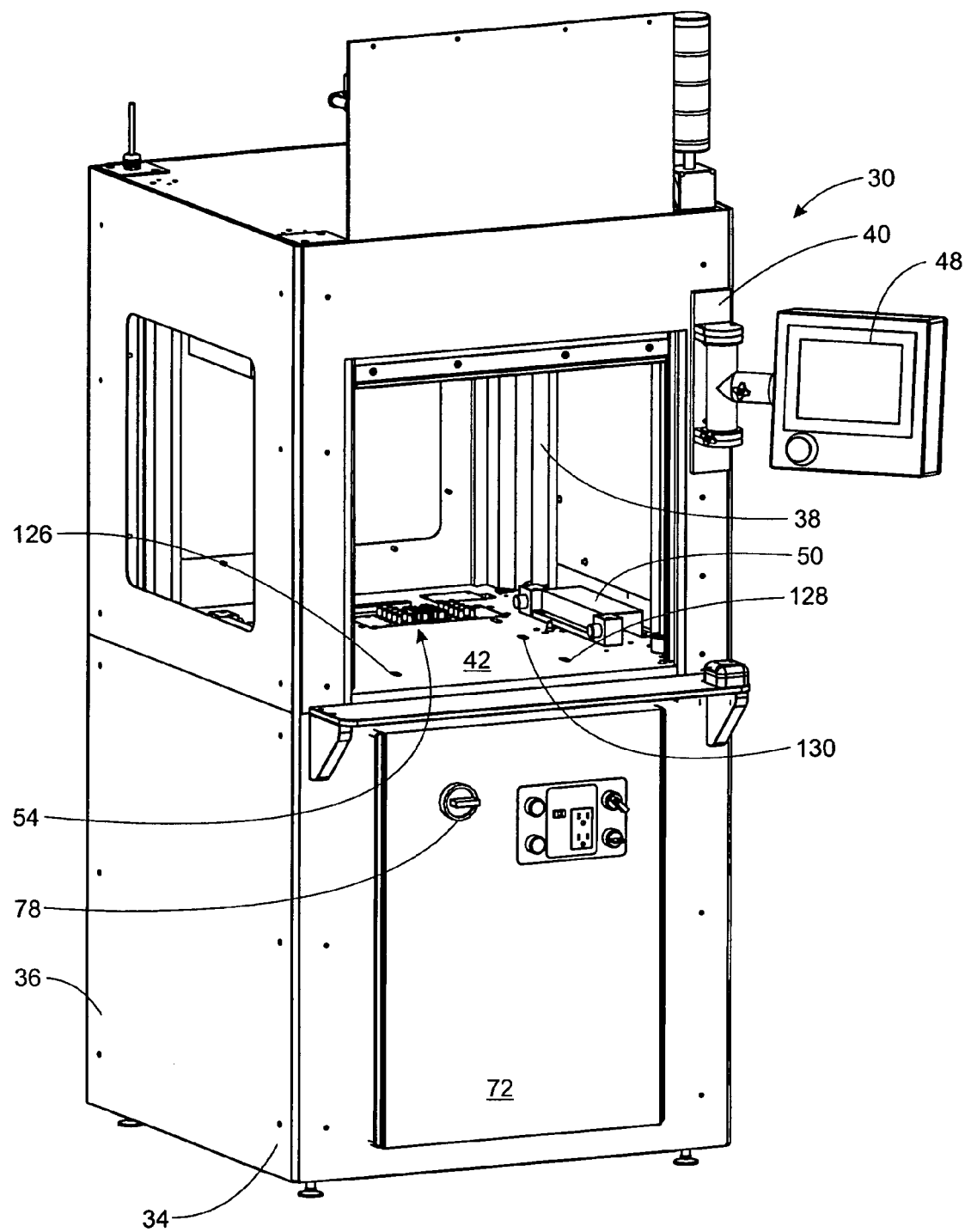
FIG. 1 is an elevated front perspective view of the modular manufacturing system of the present invention.
Figure 2:
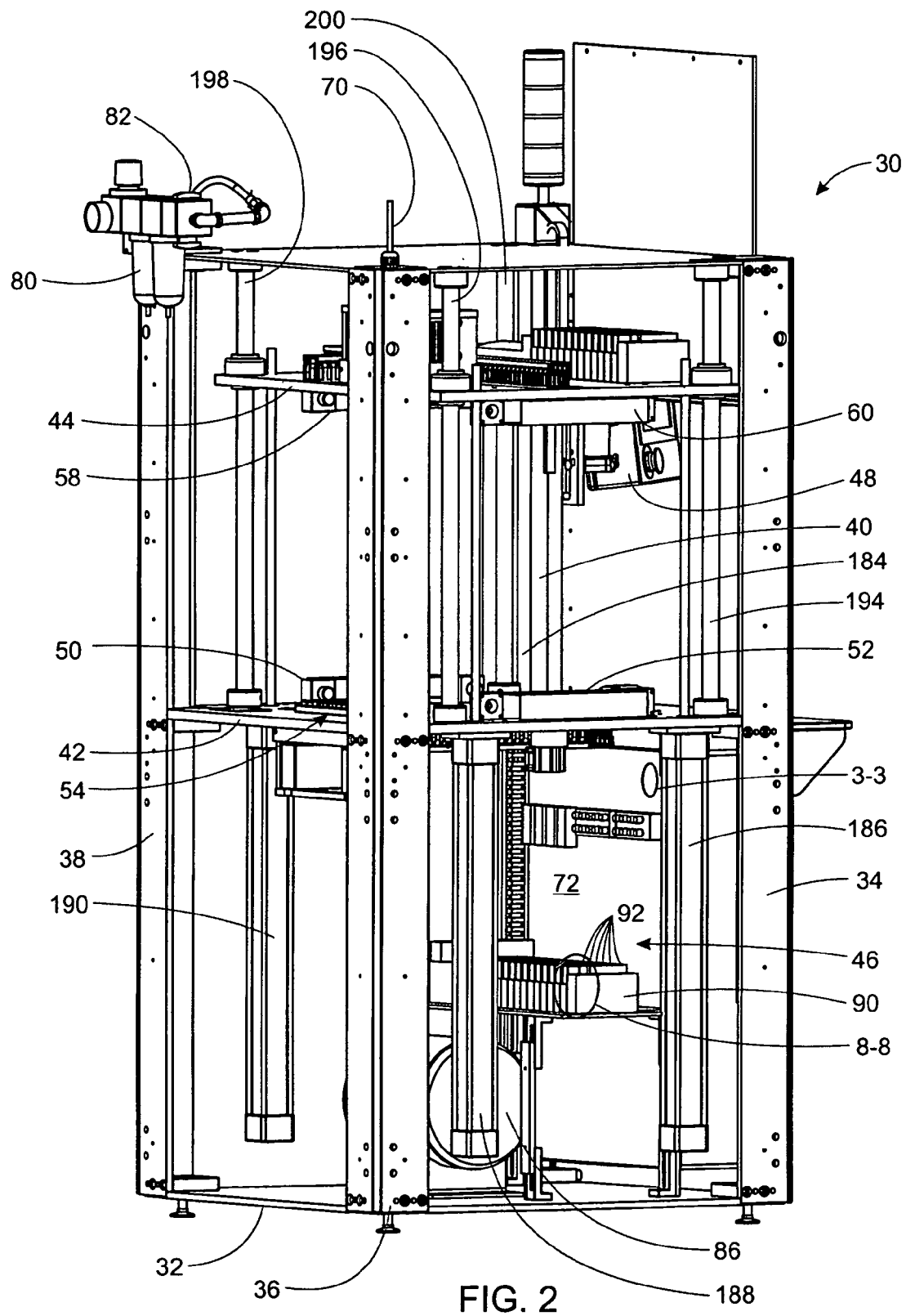
FIG. 2 is an elevated rear perspective view of the modular manufacturing of the present invention.
Figure 4:
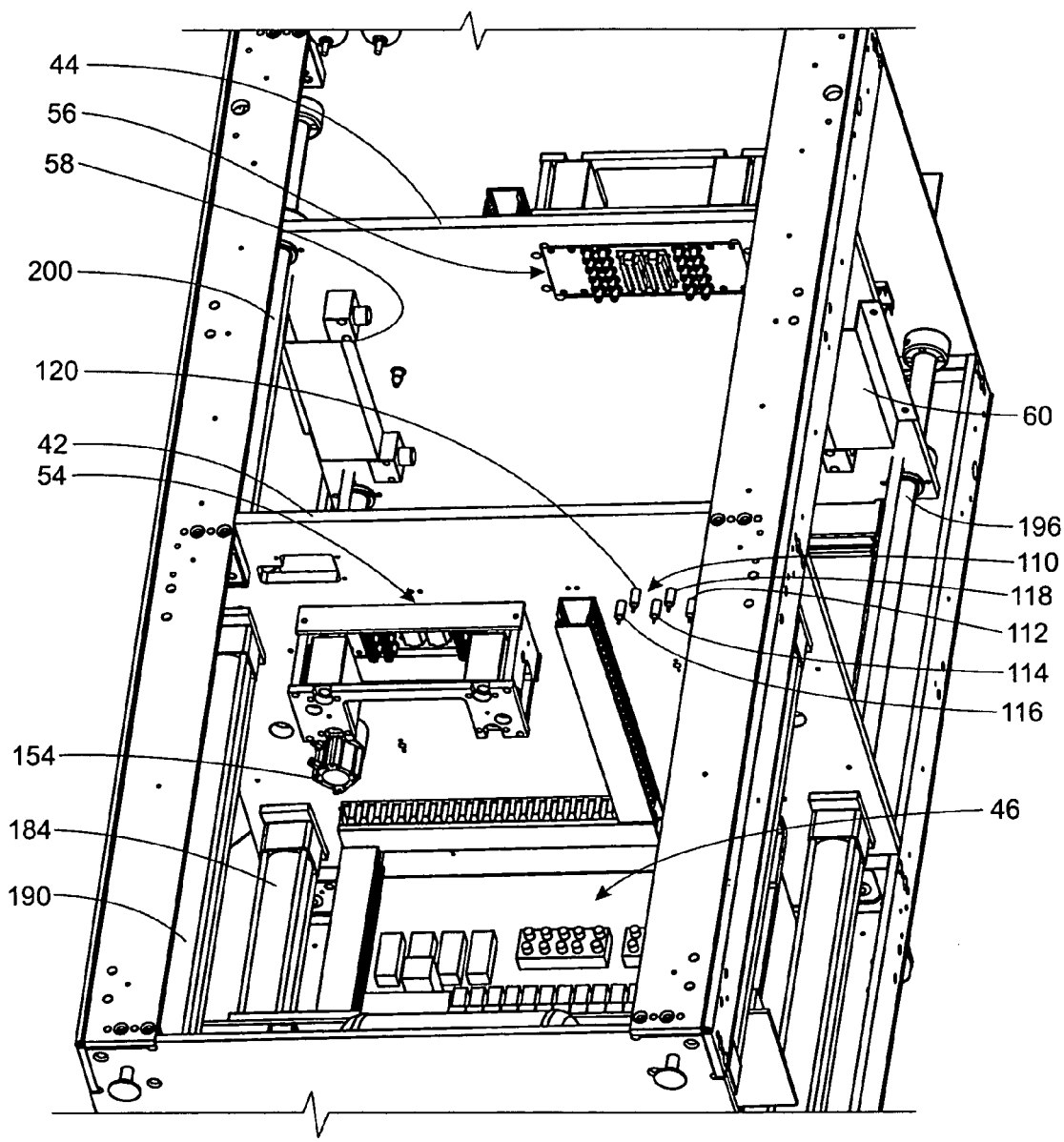
FIG. 4 is a bottom perspective rear view of the modular manufacturing system of the present invention.

As best seen in FIGS. 1, 2, and 4, a modular machining system is shown generally at 30. Modular machining system comprises a base 32, first, second, third, and fourth supports, 34, 36, 28, and 40, respectively, main deck 42, upper deck 44, control panel shown generally at 46, user interface 48, first main deck tool plate holder 50, second main deck tool plate holder 52, main deck modular service interface 54, upper deck modular service interface 56, first upper deck tool plate holder 58, and second upper deck tool plate holder 60.

Now the power feed to modular manufacturing system 30 will be described. Modular manufacturing system 30 has a power input 70 which connects at one end to an exterior electrical grid network (not shown). The power input 70 is extends from the top left corner, as best seen in FIG. 2, down the inside (not shown) of second support 36, to the inside of control panel 46 (see FIGS. 1 and 2) in area 3-3 (see FIG. 2).

Figure 3:
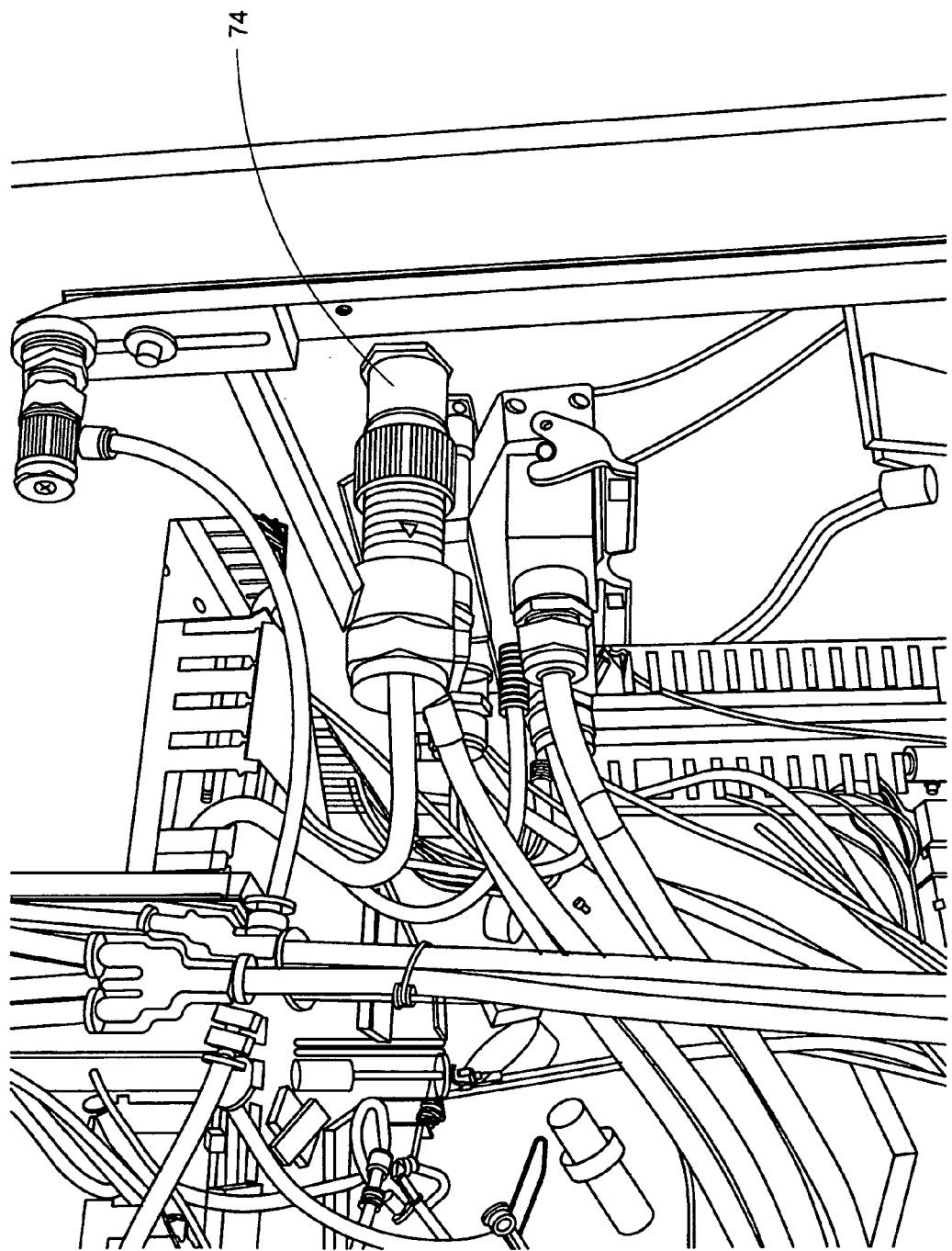
FIG. 3 is an elevated enlarged rear view of the circle 3-3 of FIG. 2, illustrating inputs to the control panel of the present invention.
Figure 5:
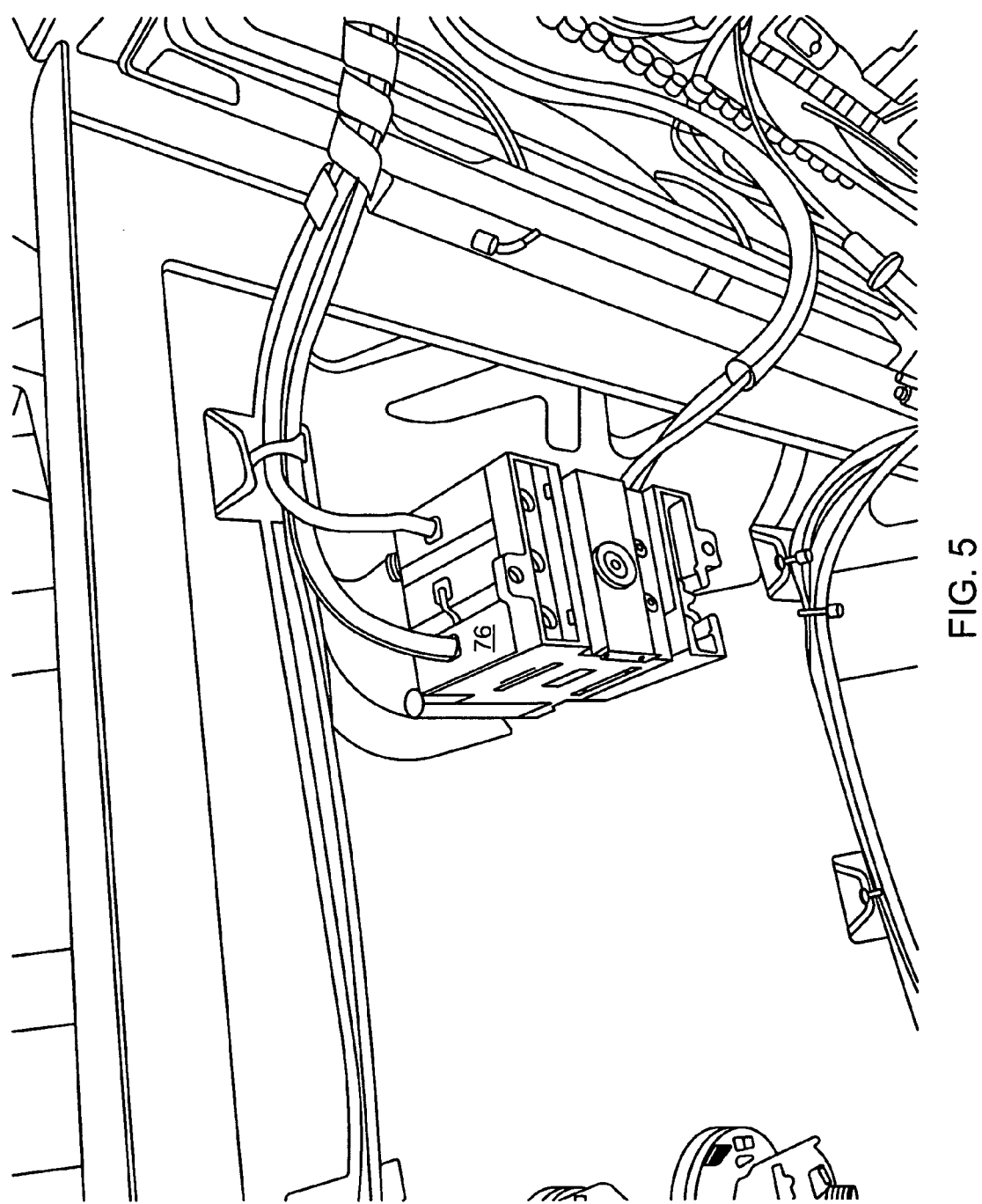
FIG. 5 is an elevated rear view of the lower front control panel cabinet door of the present invention.

It should be noted that various components in area 3-3 of FIG. 2 have been omitted for clarity. FIG. 3 shows a portion of the inside of control panel 46 in which the components of area 3-3 have not been omitted for clarity. In FIG. 3, it is seen that the power input 70 terminates via plug 74 through control panel 46. To be clear, this termination is on the physical supporting panel of control panel 46, and is not an operative power connection to any components of control panel 46. From this termination on control panel 46, as best seen in FIG. 5, power is then communicated to the inside of front door 72 at safety power stop 76. While located on the inside of front door 72, Safety power stop 76 is further connected to emergency stop switch 78 (see FIG. 1) located on the outside of front door 72 which, if actuated, creates an open circuit. Safety power stop 76, which is normally closed, operatively delivers power to control panel 46. In this way, if the emergency stop switch 78 is actuated, power is prevented from reaching any operative component of control panel 46.

Figure 7:
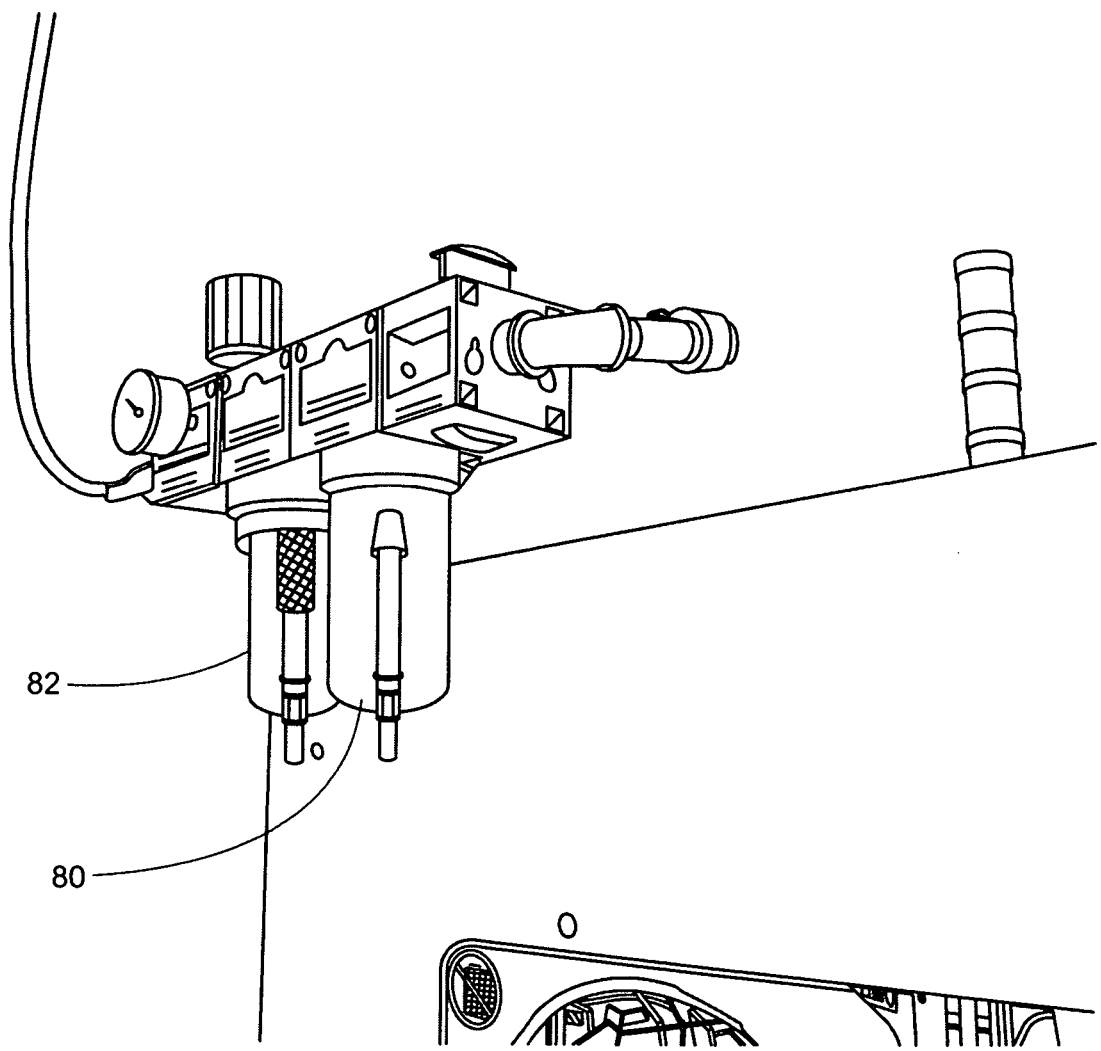
FIG. 7 is a partial elevated perspective rear view of the modular manufacturing system of the present invention.

Now the pneumatic input to modular manufacturing system will be explained. As best seen in FIGS. 2 and 7, at the right rear corner of modular manufacturing system 30, ambient air is drawn through filters 80 by pump unit 82. From pump unit 82, air is delivered into pressure accumulator tank 86. From pressure accumulator tank 86, pressurized air is output to area 8-8 shown in FIG. 2.

Figure 8:
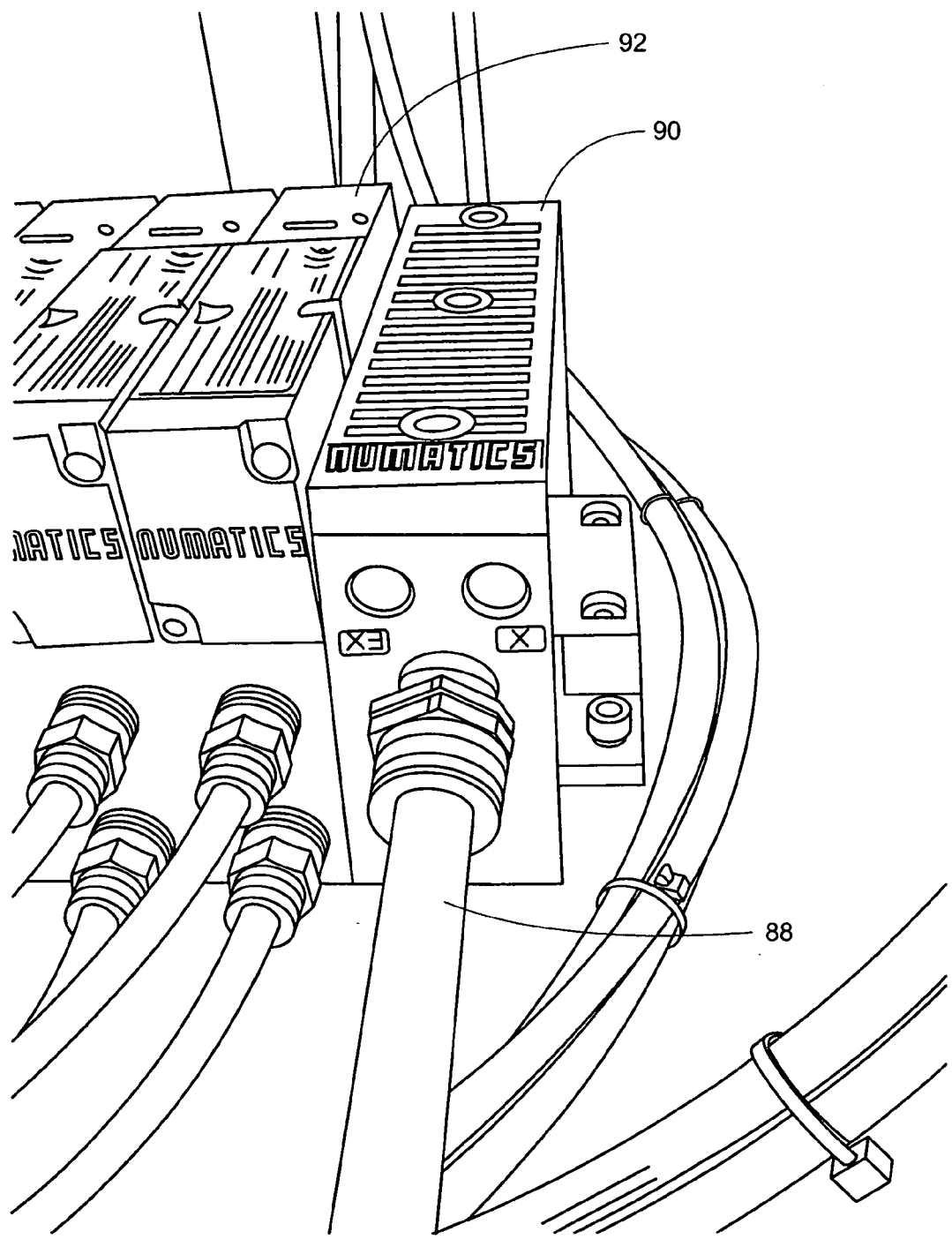
FIG. 8 is a detail view of circle 8-8 from FIG. 2.
Figure 9:
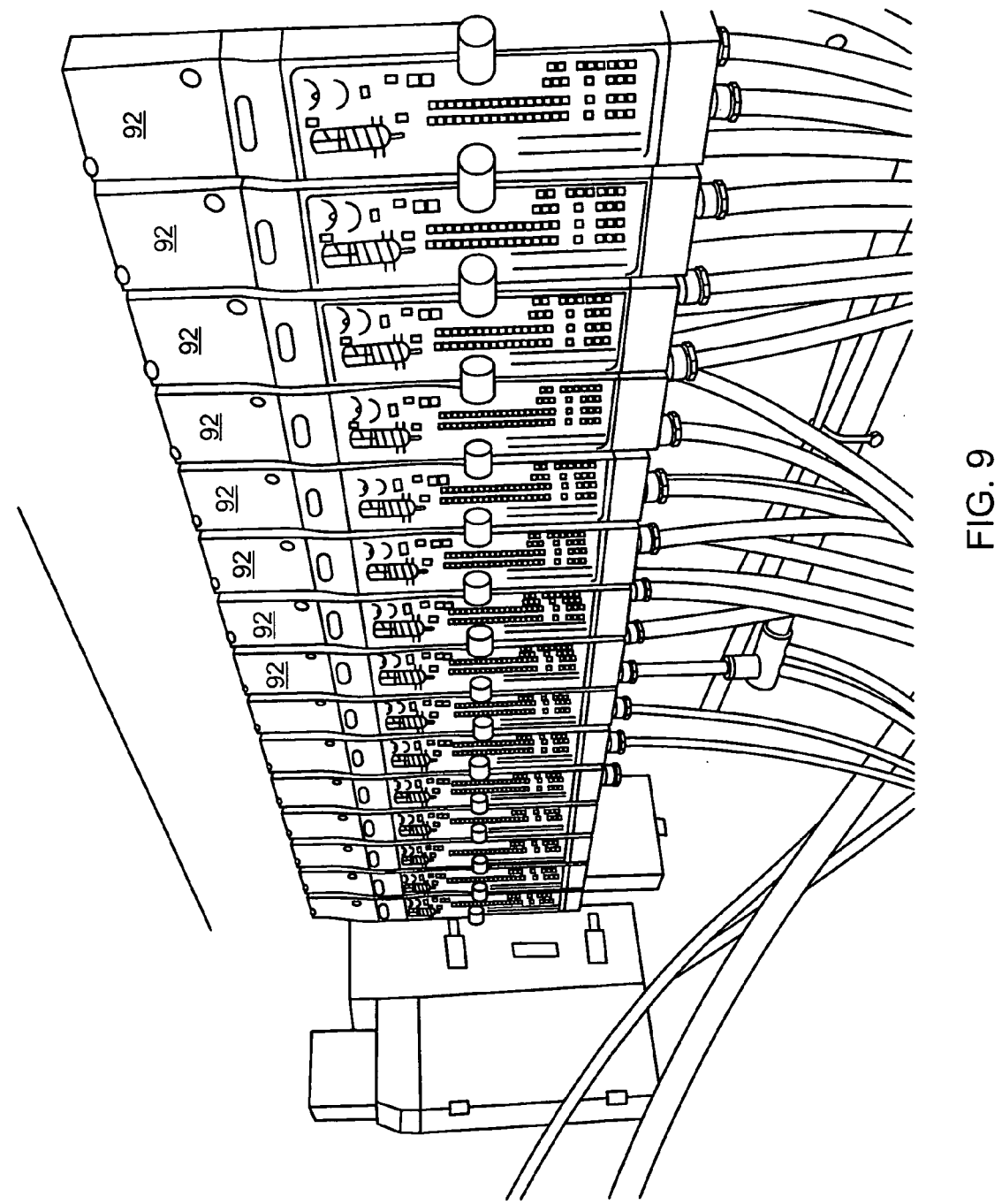
FIG. 9 is a perspective view of the pneumatic valves of the modular manufacturing system of the present invention.

Area 8-8 of FIG. 2 has various component details that have been omitted for clarity. However, as better seen in FIG. 8, the area 8-8 shows hose 88 extending from pressure accumulator tank 86 and terminating at manifold 90. Manifold 90 is connected to a plurality of valves, 92 (as best seen in FIGS. 2, 8, and 9).

Figure 14:
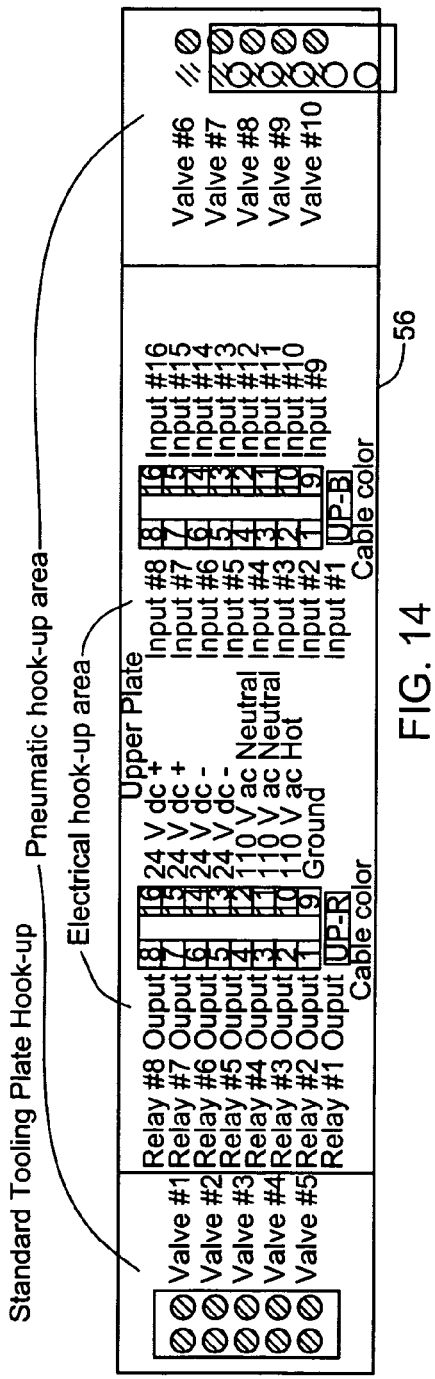
FIG. 14 is a schematic of the upper plate modular connectors of the present invention.
Figure 13:
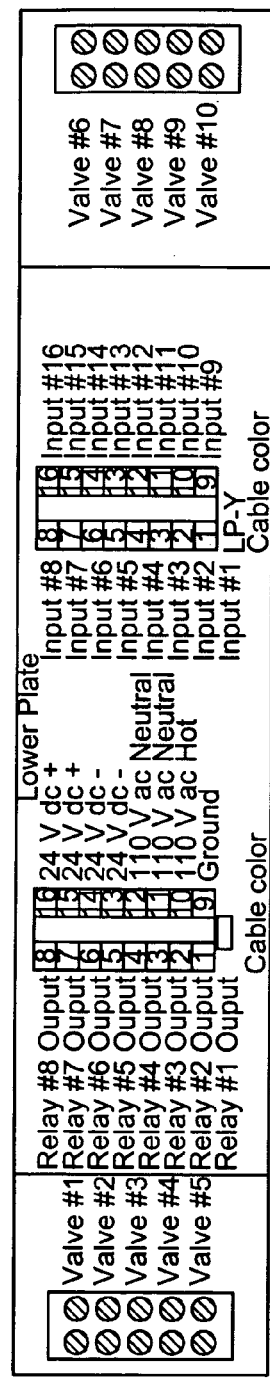
FIG. 13 is a schematic of the lower plate modular connectors of the present invention.

The service interface will now be discussed. The configuration of main deck modular service interface 54 is best shown in FIG. 13. The configuration of upper deck modular service interface 56 is best shown in FIG. 14. The output of valves 92 have 20 terminations (10 valve and 10 non-valved pressure) at main deck modular service interface 54 and twenty terminations (10 valve and 10 non-valve pressure) at upper deck modular service interface 56.

It should be noted that the inputs 1-16 (on main deck modular service interface 54 in FIG. 13 and on upper deck modular service interface in FIG. 14) are actually both data inputs (preferably input nos. 1-8) and data outputs (preferably input nos. 9-16).

Figure 6:
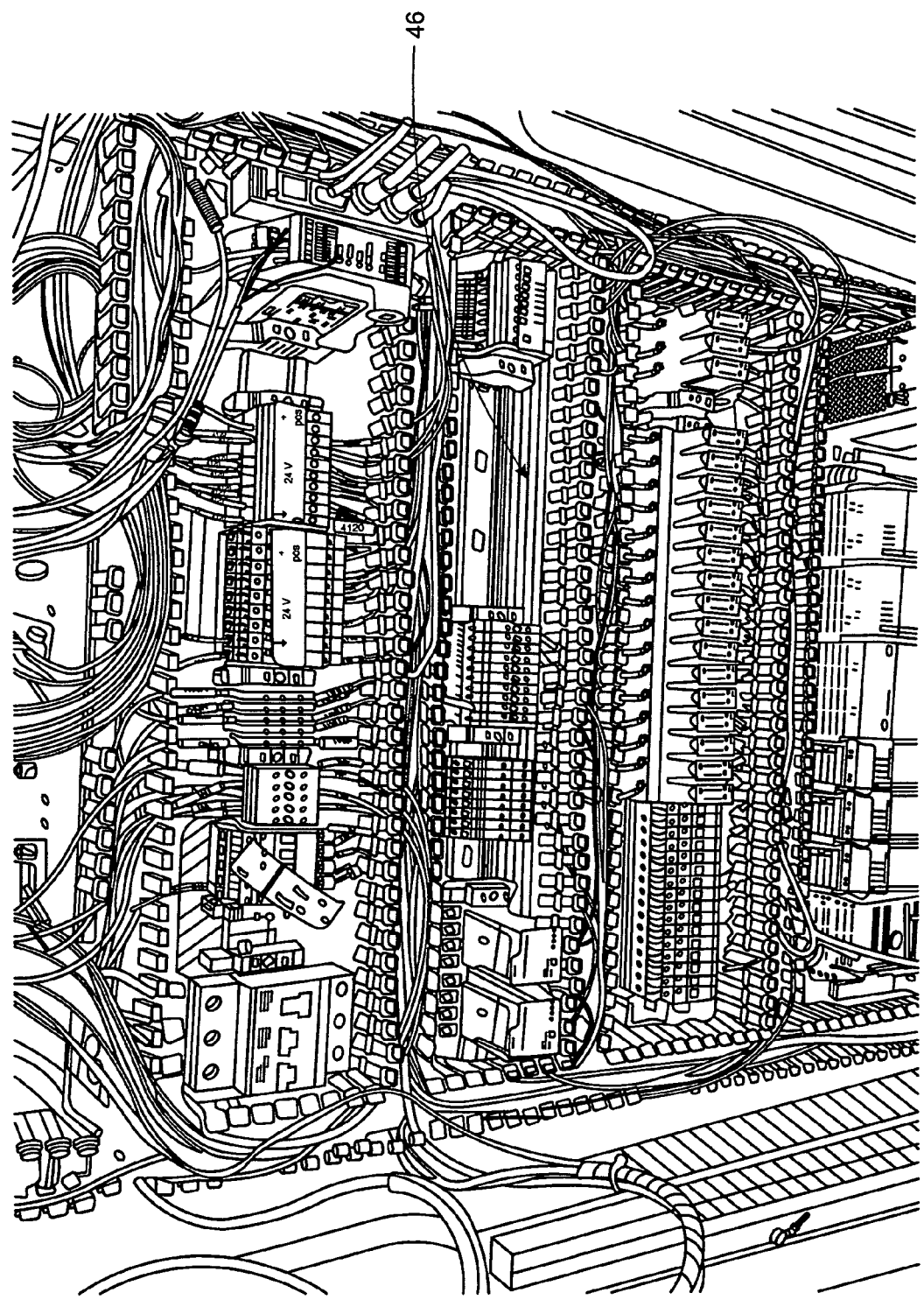
FIG. 6 is a front view of the control panel of the present invention.
Figure 10:
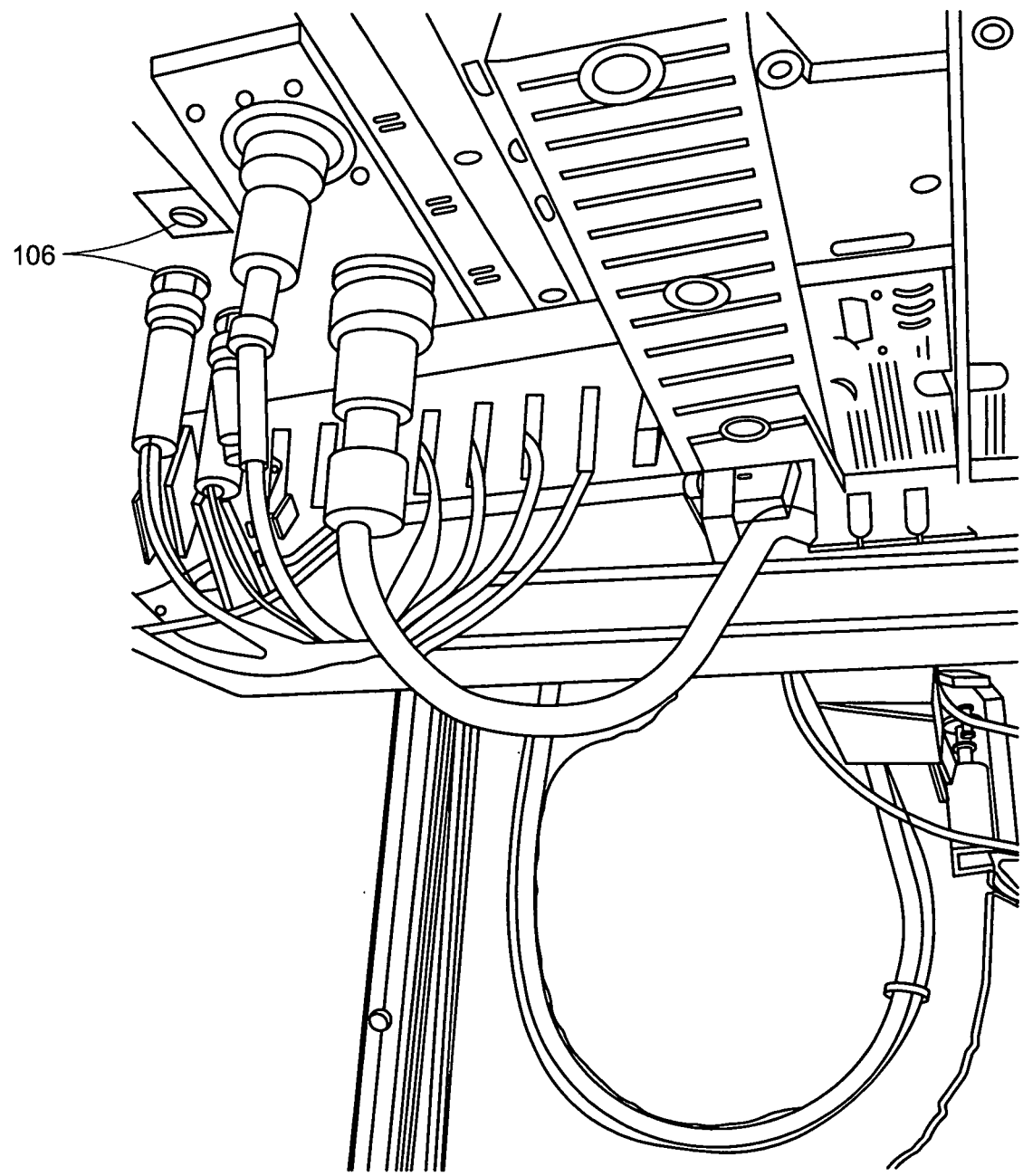
FIG. 10 is a perspective view of the left rear of control panel of the modular manufacturing system of the present invention.

The programmable logic controller is now described. As best seen in FIG. 6, control panel 46 has a general purpose programmable controller in the form of a programmable logic controller (PLC) 100 located at the bottom rack. PLC 100 is operatively connected to power from safety power stop 76, air pump 82, manifold 90, valves 92, data inputs 104 and data outputs 106 (best seen in FIG. 10), to main deck modular service interface 54, to upper deck modular service interface 56, to user interface 48, and to tool plate sensing area shown generally at 110 (which includes first tool plate sensor 112, second tool plate sensor 114, third tool plate sensor 116, single plate tool set sensor 118, and double plate tool set sensor 120).

Tool plate identification is now explained. As best seen in FIG. 4, tool plate sensing area 110 consists of five sensors: first tool plate sensing 112, second tool plate sensor 114, third tool plate sensor 116, single plate tool set sensor 118, and double plate tool set sensor 120. The sensors, 112-120, are arranged one row of three sensors, 112, 114, and 116, and a second row of two sensors, 118, 120. This arrangement is best seen in FIG. 11B. Preferably, each sensor, 112, 114, 116, 118, 120 is a inductive proximity sensor.

As seen in FIGS. 11A and 17, tool plate 142 is provided with a first tool plate flag sensor 112F, second tool plate sensor flag 114F, and third tool plate sensor flag 116F. For a particular tool plate, each tool plate flag sensor 112F, 114F, 116F, is fixed in an "on" or "off" position. In addition, a notch N in an edge of a tool plate 142 may or may not be placed above single plate tool set sensor 118 and double plate tool set sensor 120. The presence of a notch N above single plate tool set sensor 118 (not shown) signifies a single plate tool set; similarly, the presence of a notch N above a double plate tool set sensor 120 (as shown in FIG. 11A) signifies a double plate tool set.

Thus, according to whether a particular tool set is a single plate or double plate, and according to the first row of three flags, 112F, 114F, 116F, the chart in FIG. 11C shows that up to eight separate, unique single tool plate sets may be separately distinguished (numbered 9-11). For example, if notch N is over the single tool set sensor 118, flag 112F is "off", flag 114F is "on", and flag 116F is "off", then PLC 100 will recognize that tool number 11 is ready for operation. PLC 100 will accordingly initiate the software associated with tool number 11, including the appropriate user interface. Similarly, up to eight separate, unique double tool plate sets may be separately distinguished. For example, with respect to FIG. 11A, double tool set tool number 4 is shown; namely notch N signifies a double tool set, flag 112F is "off", flag 114F is "off", and flag 116F is "on". Upon recognition of this unique tool set, PLC 100 automatically can bring up the correct user interface, energize specific power feeds, energize specific pneumatic feeds, open specific data links, and adjust the vertical height of decks 42, 44.

With reference to FIG. 12, each flag, 112F, 114F, 116F comprises a cap 172 which works in tandem with the proximity switch sensors 112, 113, and 116. Each cap 172 has an exterior shoulder 174, and identically dimensioned exterior threads 176 on each side of exterior shoulder 174. Each cap 172 defines an interior space 178 having a height sufficient to avoid proximity detection by proximity sensors 112, 114 or 116. Each cap 172 is further provided with a metallic end face 180 which may be a separate piece or integral. As best seen in FIG. 11A, the exterior surface of metallic end face 180 is preferably stamped or engraved with the word "OFF". The distance between the exterior shoulder 174 and the exterior surface of metallic end face 180 is less than the thickness of tool plate 142. In other words, cap 172 is an externally threaded tube with a solid end face 180 and a concentric exterior shoulder 174 having a wider diameter than the tube and located a precise distance from the solid end face 180.

In use, a cap 172 is reversibly threaded into each of the three flag locations to serve as flags 112F, 114F, and 116F. For example, if a cap is inserted (threaded into tool plate 142) with the "OFF" lettering up in each of the three flag locations, when the tool plate 142 is in position over the sensors 112, 114, 116, then the interior space 178 is presented to each of sensors 112, 114, and 116. Accordingly, sensors 112, 114, and 116 will each indicate a lack of proximity and will not be engaged. According to FIG. 11C, depending on whether a single tool set or a double tool set is indicated, this configuration will be recognized as either tool number 8 or tool number 16.

In a separate example, if cap 172 is inserted (threaded into tool plate 142) upside down (relative to the previous example), then the interior space 178 is open to the upper surface of tool plate 142. In this case, the metallic end face 180 is not visible to the upper surface of tool plate 142. Because the distance between the exterior shoulder 174 and the exterior surface of metallic end face 180 is less than the thickness of tool plate 142, the surface of metallic end face 180 is not planar with the bottom surface of tool plate 142. Instead, there is a short distance (height) and space between main deck 42 and the surface of metallic end face 180. However, this short distance is adapted to be within the inductive sensing range of proximity sensors 112, 114, and 116. Accordingly, each proximity sensor 112, 114, and 116 will indicate proximity and will be engaged—providing an "ON" indication. According to FIG. 11C, depending on whether a single tool set or a double tool set is indicated, this configuration will be recognized as either tool number 1 or tool number 9.

Once the flags, 112F, 114F, and 116F are set, they are intended to remain unchanged with the tool plate.

Figure 16:
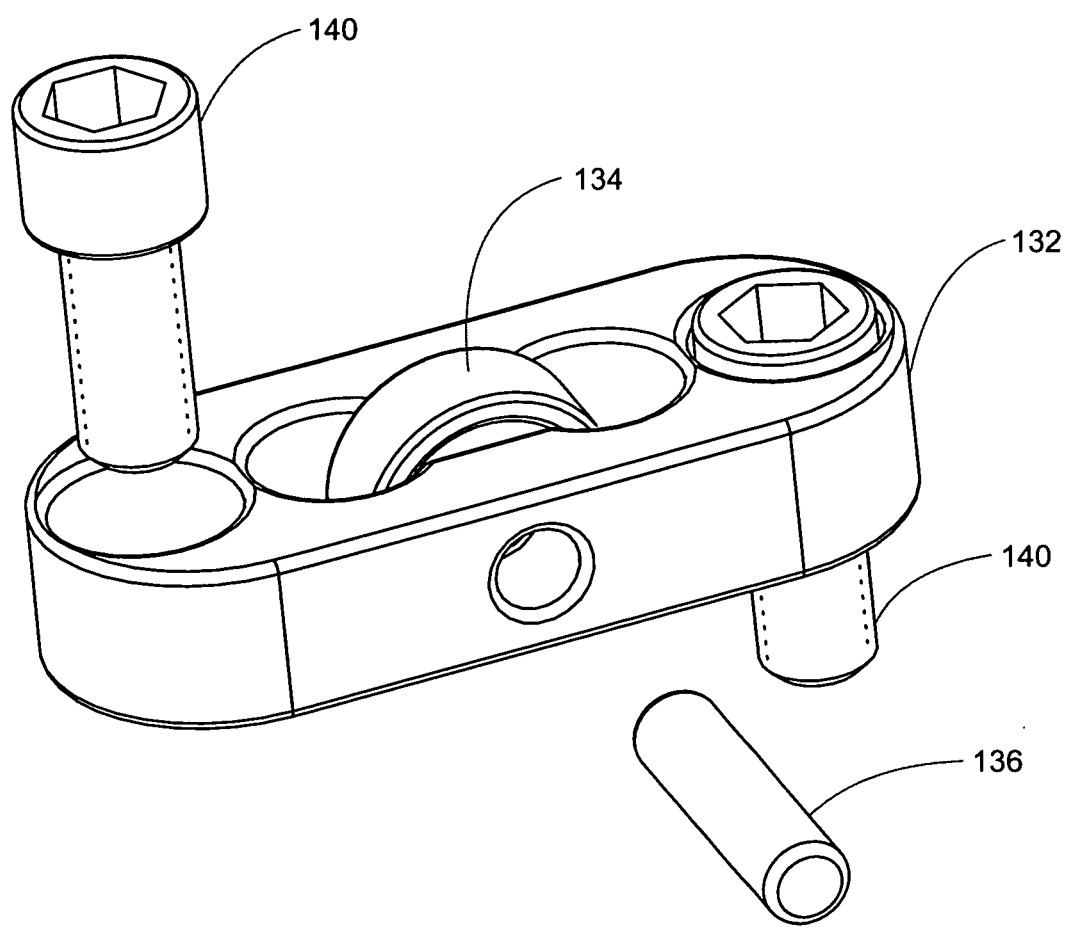
FIG. 16 is a perspective view of the roller assembly of the present invention.

Physical placement of tool plate 142 into modular manufacturing systems is now explained. As best seen in FIGS. 4, 11 and 12, tool plate sensing area 110 is located on the left side towards the rear of main deck 42. When a single tool plate 142 is placed on main deck 42, the travel of tool plate is assisted via first roller 126, second roller 128, and third roller 130. Each roller 126, 128, 130 is assembled in the manner shown in FIG. 16. For example, first roller 126 comprises a roller block 132, a rolling bearing 134 held in place to roller block 132 by a pin 136, with the roller block 132 being fixed to main deck 42 preferably by bolts 140. Preferably, the height of roller block 132 is less than the thickness of main deck 42 to enable bolts 142 to engage main deck 42. Rolling bearing 134 will thus extend higher than the level of the main deck 42.

As seen in FIG. 17, the bottom of single tool plate 142 defines a first groove 144, a second groove 146, and a third groove 148. None of the grooves, 144, 146, 148 are in vertical or horizontal registration with respect to each other. Each groove, 144, 146, and 148 has a gradually increasing depth, and is shallower at the initial entry point of each roller. Each groove, 144, 146, 148 increases in depth such that at the end of each groove, the depth exceeds the height that rolling bearing 134 extends from main deck 42.

As a result, as the leading edge of single tool plate 142 is placed on main deck 42 and translated towards the rear, single tool plate 142 encounters first roller 126, second roller 128, and third roller 130. More specifically, first roller 126 eventually finds first groove 144; second roller 128 eventually finds second groove 146, and third roller eventually finds third groove 148. When the depth of each groove of single tool plate 142 exceeds the extension height of rolling bearing 134 of each roller (126, 128, 130), single tool plate 142 will cease to roll on first, second and third rollers, 126, 128, 130, respectively, and will instead be disposed surface-to-surface (flat) on main deck 42. Preferably, the end edge of each groove (144, 146, 148) is in contact with a surface of rolling bearing 134 such that the tool plate is in a known position mechanically. While only three grooves (144, 146, 148) are discussed, it should be appreciated that in FIG. 1, there are actually shown six grooves, with three grooves on each side of main deck 42. However, for simplicity and brevity, only three grooves (144, 146, 148) are discussed in detail.

In addition to a known position mechanically, there is also electronic verification of position. Specifically, as discussed previously, as the leading edge of single tool plate 142 travels over tool plate sensing area 110, the flags (112F, 114F, 116F) and presence of notch N is noted.

Figure 15:
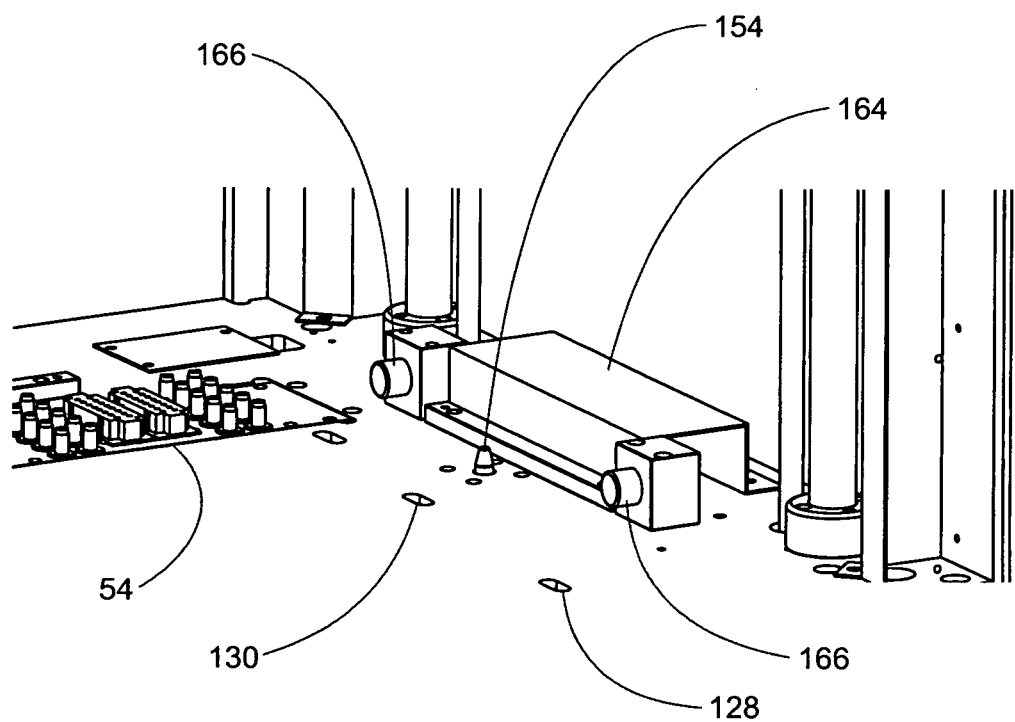
FIG. 15 is a front perspective view of the tool plate holding table of the present invention.

Upon verification of position and unique identification of tool set, PLC 100 further mechanically locks the position of tool plate 142. Specifically, first pin 152 (not shown) is raised above the surface of main deck 42 and extended into first tool plate aperture 152A; at the same time, second pin 154 (FIGS. 4 and 15) is raised above the surface of main deck 42 and extended into second tool plate aperture 154A.

As a separate mechanical guarantee of position, first tool set plate 142 is provided, on the top surface, at its right and left sides with a strip of thick wear resistant plastic. First clamp block 160 is actuated (preferably pneumatically) to extend first clamp shafts 162. First clamp shafts 162 are slightly lower than the surface of the plastic strip. Accordingly, first clamp shafts 162 encounter, and then slide over the strip of plastic, compressing the plastic strip and ensuring a friction fit. This applies clamping pressure to maintain the lower surface of tool set plate 142 against the surface of main deck 42. Similarly, as seen in FIG. 4, the right side, second clamp block 164 is actuated to extend second clamp shafts 166 (seen in FIG. 15 in the extended position) over the strip of plastic on the right side of tool plate 142, thereby applying clamping pressure on both right and left sides of tool plate 142.

Connection of services (such as electrical, pneumatic, and data) is now discussed. Once the position of tool plate 142 has been verified electronically, and mechanically fixed, it should be appreciated that main deck modular service interface 54 is in vertical registry and spaced below tool plate modular service interface 54T. Tool plate modular service interface 54T mirrors (not specifically shown) the layout connections of main deck modular service interface 54. At this point, PLC 100 raises main deck modular service interface 54 up past the surface of main deck 42. The means for raising and lowering main deck modular service interface 54 is disposed underneath main deck 42, and is shown in FIG. 4. When main deck modular service interface 54 is raised, it engages tool plate modular service interface 54T such that power, pneumatic and data connections from both interfaces 54, 54T are connected simultaneously. Even though physically connected, for a specific tool plate, not all power sources, pneumatic sources, and data links are necessarily activated—rather only the ones which are necessary for that specific tool plate.

Upper deck 44 is now discussed. While it may be obvious, a single tool set comprises a single tool plate where manufacturing operations originate from the single tool plate. A double tool set indicates two tool plates—a lower plate and an upper plate. While much of the previous description has been directed to the operation of the lower tool plate, the modular manufacturing system 30 of the present invention has an upper deck 44 in registry with main deck 42. Upper deck 44 is configured in mirror image to main deck 42 with respect to upper deck modular service interface 56. In addition, upper deck 44 is configured in mirror image to main deck 42 with respect to fixation of an upper tool plate through the use of identical fixation means: first upper deck tool plate holder 58, second upper deck tool plate holder 60, and extendable pins (not shown) similar to first pin 152 and second pin 154. Understandably, upper deck 44 does not include any tool plate identification (as performed by tool plate sensing area 110 on main deck 42), and does not include rollers such as first roller 126, second roller 128, and third roller 130.

Movement of decks is now described. Main deck 42 may be vertically adjusted by translating along first translation guide 184, second translation guide 186, third translation guide 188, and fourth translation guide 190. Similarly, upper deck 44 may be vertically adjusted by translating along first translation rod 194, second translation rod 196, third translation rod 198, and fourth translation guide 200.

The normal operation of the invention is now discussed. In a commercial manufacturing environment, the present invention would be utilized in the following manner. Tooling is created and fixed to a tool plate having a notch N appropriate for whether the tool involves a single plate or double plate. The tool plate also has main deck tool plate modular service interface 54T, and the tooling is appropriately connected to the necessary inputs and outputs. The tool plate is assigned a tool number, and the flags 112F, 114F, and 116F are set. PLC 100 is programmed to recognize the assigned tool number, to activate and control various functions of the tool, to mechanically lock the tool plate in place, to adjust the height of the decks (42, 44), and to provide a user interface that provides information and control over the manufacturing process. The tool plate is loaded, and manufacturing commences. After the manufacturing run has concluded (for example wheels for a toy car have been made), the tool plate is removed. A different second tool plate is loaded. The PLC 100 recognizes the tool number, activates the mechanical locks, activates the appropriate services from main deck modular service interface 54, adjusts the height of the decks (42, 44), and manufacturing commences. After the manufacturing run has concluded (for example the top body for a toy car), the second tool plate is removed. A different third tool plate is loaded. The PLC 100 recognizes the tool number, activates the mechanical locks, activates the appropriate services from main deck modular service interface 54, adjusts the height of the decks (42, 44), and manufacturing commences. After the manufacturing run has concluded (for example the bottom body for a toy car), the third tool plate is removed. In the present example, a single modular manufacturing system 30 is used to perform three separate manufacturing operations, instead of using three separate machines to perform three separate manufacturing steps.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, the present invention is adapted to allow multiple modular manufacturing units 30 to be bolted together to increase the operational area. So, it is possible to bolt three modular manufacturing units 30 to form an "L" shape, or to form one long area operational area. Because each modular manufacturing unit 30 employs standard components in volume, bolting multiple units 30 may be more economical than making a single, larger custom machine. As a separate example, while the present invention prefers the use of pneumatic power, it is entirely possible to use a different kind of fluid power—hydraulic power—in lieu of a pneumatic system. Thus, the breadth and scope of the present invention should not be limited by any of the above-described exemplary embodiments, but should be defined only in accordance with the following claims appended hereto and their equivalents.

What is claimed is:

1. A modular manufacturing system for carrying out a series of operations on a manufacturing unit comprising:
    a frame;
    a raised deck connected to said frame, having a plurality of adjustable clamps for detachably anchoring an automated manufacturing unit, a plurality of proximity sensors disposed in a predetermined pattern, and a adjustably-positioned modular service interface providing a plurality of mechanical, electrical, data, and pneumatic connections;
    a user interface connected to said frame for providing and enabling control of said manufacturing units by a human operator;
    a control panel housing a general purpose programmable controller for regulating and coordinating the overall operation of manufacturing units; and
    wherein said general purpose programmable controller has a power input, a plurality of power outputs, a plurality of data inputs, a plurality of data outputs,
    wherein said general purpose programmable controller is connected to said electrical, data and pneumatic connections on said modular service interface, and adjustably controls the relative position of said modular service interface and said raised deck;
    wherein said general purpose programmable controller is further connected to and controls the position said plurality of adjustable clamps on said raised deck, said general purpose programmable controller being in communication with said user interface and said plurality of proximity sensors on said raised deck, and identifying a unique manufacturing unit based on the status of said plurality of proximity sensors.

2. A modular manufacturing system according to claim 1, wherein said raised deck further comprises:
    a plurality of rollers extending above the surface of said raised deck; and
    a plurality of pins that are vertically adjustable between a position below the surface of raised deck to a position above the surface of raised deck.

3. A modular manufacturing system according to claim 1, further comprises:
   a manufacturing unit having a base plate, said base plate having a plurality of proximity flags and further having an edge area for placing a notch in one of two designated locations, said notch reducing the thickness of said base plate.

4. A modular manufacturing system according to claim 3, wherein said manufacturing unit is disposed on said raised deck.

5. A modular manufacturing system according to claim 1, further comprising:
   a manufacturing unit having a base plate, said base plate having a modular interface extending towards the lower surface of said base plate, and a plurality of grooves disposed on the lower surface of said base plate;
   wherein said modular interface provides a plurality of mechanical, electrical, data, and pneumatic connections;
   a plurality of holes for receiving pins; and
   wherein said grooves increase in depth linearly.

6. A modular manufacturing system according to claim 5, wherein said manufacturing unit is disposed on said raised deck.

7. A modular manufacturing system according to claim 1, further comprising:
   an upper deck spaced above said raised deck having a second plurality of adjustable clamps for detachably anchoring an automated manufacturing unit, and having a second adjustably-positioned modular service interface providing a plurality of mechanical, electrical, data, and pneumatic connections; and
   wherein said general purpose programmable controller is further connected to and controls the position of said second plurality of adjustable clamps on said upper deck, said general purpose programmable controller being in communication with said user interface and said plurality of proximity sensors on said raised deck.

8. A tooling plate for use in a modular manufacturing system comprising:
   a base plate having an edge area for placing a notch in one of two designated locations, said notch reducing the thickness of said tooling plate;
   a plurality of proximity flags disposed on said base plate, and wherein said plurality of proximity flags provides a plurality of identification of said tooling plate;
   a modular interface fixed to said tooling plate extending towards the lower surface of said tooling plate; and
   wherein said modular interface provides a plurality of mechanical, electrical, data, and pneumatic connections.

9. A tooling plate according to claim 8, further comprising:
   a plurality of grooves disposed on the lower surface of said tooling plate, said grooves increasing in depth linearly; and
   a plurality of holes for receiving pins.

* * * * *